UNITED STATES PATENT OFFICE.

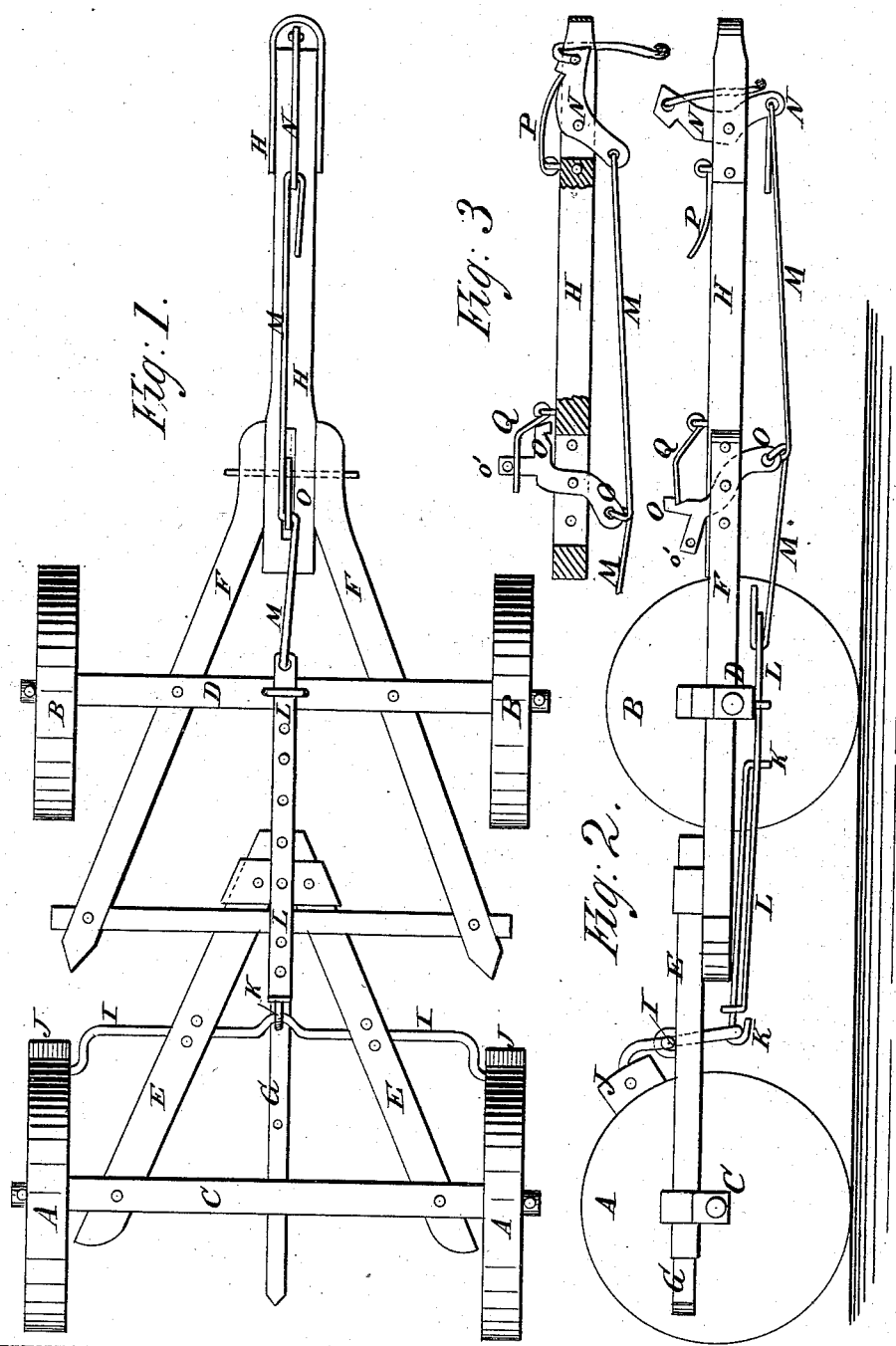

WILLIAM DE RAY, OF MURRAY, KENTUCKY.

IMPROVEMENT IN BRAKES FOR WAGONS.

Specification forming part of Letters Patent No. 215,585, dated May 20, 1879; application filed February 25, 1879.

*To all whom it may concern:*

Be it known that I, WILLIAM DE RAY, of Murray, in the county of Callaway and State of Kentucky, have invented a new and useful Improvement in Wagon-Brakes, of which the following is a specification.

Figure 1 is a view of the under side of a wagon-gearing to which my improved brake has been applied. Fig. 2 is a side view of the same, two of the wheels being removed to show the construction. Fig. 3 is a side view of the tongue, partly in section, to show the construction.

Similar letters of reference indicate corresponding parts.

The object of this invention is to furnish an improved brake for wagons which shall be so constructed that it will be applied by the operation of the team in holding back, and will be taken off by the operation of the team in drawing, and which may be locked in either position.

The invention consists in means for locking the brakes, holding them off the wheels, and adjusting their throw, as hereinafter described.

A represents the rear wheels, B the forward wheels, C the rear axle, D the forward axle, E the rear hounds, F the forward hounds, G the reach, and H the tongue, of a wagon, about the construction of which parts there is nothing new.

I is the brake-bar, which works in bearings attached to the rear hounds, E. The ends of the brake-bar I are bent upward, rearward, and outward, and have brake-shoes J attached to them. The middle part of the brake-bar I is bent into U form, or has a loop attached to it to pass around the reach G.

If desired, the brake-bar I may be made straight, and may slide in keepers attached to the rear hounds, E.

To the loop of the brake-bar I is pivoted the rear end of a rod, K, which passes through a hole in the turned-up rear end of the bar L, and has a hook formed upon its forward end to hook into a hole in the said bar L. Several holes are formed in the bar L to receive the hook of the rod K, to allow the said rod and bar to be adjusted longer or shorter, as the reach G is adjusted to make the wagon-gearing longer or shorter.

The forward part of the bar L passes through a keeper attached to the lower side of the forward axle, D, and to its forward end is pivoted the rear end of the rod M, which passes forward beneath the tongue H, and its forward end is pivoted to the lower end of the curved lever N. The lever N passes up through and is pivoted in a slot or mortise in the forward end of the tongue H, and with its upper end is designed to be connected with the neck-yoke or breast-chains of the horses, so that the operation of holding back will operate the said lever N and apply the brake.

O is a bent lever, which passes through a slot or mortise in the rear end of the tongue H, and is pivoted to the said tongue by the bolt that secures the tongue to the forward hounds, F. The lower end of the lever O is pivoted to the rod M, and upon its upper part is formed an upwardly-projecting arm or pin, o', which passes through the double-tree, so that the operation of drawing, when the wagon has reached the bottom of the hill, or encounters an obstruction in going down the hill, will withdraw the brake.

To the forward part of the tongue H, in the rear of the lever N, is hinged a catch-bar, P, which may be swung forward to engage with a notch in the rear side of the lever N when the brake is withdrawn to allow the team to back the wagon or make a short turn without applying the brake. To the rear part of the tongue H, in front of the lever O, is hinged a catch-bar, Q, which may be swung back to engage with a notch in the forward side of the upper end of the lever O, to lock the brake in place when applied.

The catch-bar Q may have a slot in it to receive the arm or pin o' of the lever O, so that it may also be used for locking the lever O in place when the brake is off. The brake is particularly designed for use when the driver rides one of the wheel-horses, so that he can operate the catch-bars P Q with his foot or whip-handle.

If desired, a spring may be placed upon each side of the forward hounds, or one under the double-tree and attached to the said hounds and double-tree, so that if the team should balk on a steep hill-side, or pull or break loose from the wagon, the said springs or spring may throw on the brake, and thus hold the wagon and prevent any damage from being done by the wagon running back down the hill.

If desired, brake shoes or blocks may be attached to the top of the ends of the double-tree, which, when the brake is thrown back, will be thrown back against the front wheels and lock them.

I am aware that it is not new to operate wagon-brakes by putting on a pivoted lever or by the holding back of the horses.

I am also aware that it is not new in wagon-brakes to use a notched quadrant under the end of tongue and a sliding plate connected with hand mechanism; but

What I claim is—

1. The catch P, pivoted on tongue and working in notch of lever N, to hold the brake off the wheels, as shown and described.

2. The combination of the catch Q, pivoted on tongue, with a lever, O, pivoted to the rod M, fulcrumed in a slot of tongue, and provided with an arm, o', as and for the purpose specified.

WILLIAM DE RAY.

Witnesses:
  W. L. WEATHERS,
  W. W. WEATHERS.